United States Patent

Raamot et al.

[11] Patent Number: 6,108,333
[45] Date of Patent: Aug. 22, 2000

[54] NONBLOCKING SYNCHRONOUS DIGITAL HIERARCHY COLUMN CROSS-POINT SWITCH

[75] Inventors: Jaan Raamot, Broomfield; Silverio C. Vasquez, Westminster, both of Colo.

[73] Assignee: Lucent Technologies Inc., Murray Hill, N.J.

[21] Appl. No.: 09/028,798

[22] Filed: Feb. 25, 1998

[51] Int. Cl.$^7$ .................................................. H04Q 11/04
[52] U.S. Cl. .......................................... 370/370; 370/369
[58] Field of Search ..................... 370/369, 370, 370/380

[56] References Cited

U.S. PATENT DOCUMENTS

| | | | |
|---|---|---|---|
| 3,652,803 | 3/1972 | Joél, Jr. ................................... | 370/370 |
| 3,737,586 | 6/1973 | Johnson ................................. | 370/370 |
| 3,906,164 | 9/1975 | Philip et al. .......................... | 370/370 |
| 3,909,786 | 9/1975 | Lawrence ............................. | 370/370 |
| 3,925,620 | 12/1975 | Edstrom et al. ...................... | 370/370 |
| 4,071,703 | 1/1978 | Schaffter .............................. | 370/370 |
| 4,495,615 | 1/1985 | Wilcke ................................. | 370/370 |
| 4,771,420 | 9/1988 | Deschaine et al. ................... | 370/66 |
| 4,797,589 | 1/1989 | Collins ................................. | 370/370 |

FOREIGN PATENT DOCUMENTS

| | | |
|---|---|---|
| 0 552 694 | 7/1993 | European Pat. Off. . |
| 42 28 694 | 3/1994 | Germany . |
| 5-344087 | 12/1993 | Japan ................................... 370/370 |
| 95/32599 | 11/1995 | WIPO . |

OTHER PUBLICATIONS

S.D. Personick et al., "Communications Switching—From Operators to Photonics", Proceedings of the IEEE, vol. 75, No. 10, pp. 1380–1403, Oct. 1987.

A.E. Joel, Jr., et al., "Guest Editorial Circuit Switching for Broadband ISDN and Beyond", IEEE Journal on Selected Areas in Communications, vol. 14, No. 2, pp. 289–292, Feb. 1996.

R.L. Pawelski, "A Multimedia STM Switch Prototype", IEEE Journal on Selected Areas in Communications, vol. 14, No. 2, pp. 317–327, Feb. 1996.

*Primary Examiner*—Salvatore Cangialosi
*Attorney, Agent, or Firm*—John C. Moran

[57] ABSTRACT

Allowing the implementation of a strictly nonblocking cross-point space switch central stage for the switching of SDH frames or other formats. The port terminating each incoming link has a time slot interchange (TSI) unit. Each TSI unit comprises incoming and outgoing sets of TSI's. The TSI's properly arrange each byte of each row of the STM-1 frame or other formats to be in the proper position for transmission on the STM-1 links. Within the STM-1 frame structure, each row of a frame is switched in an identical manner but the column designations within a row are switched differently. In response to rearranged frames from incoming TSI's, a cross-point switch is responsive to each column of each of the rows to switch each of the bytes of that column to the appropriate outgoing TSI for rearrangement and transmission on a STM-1 link.

4 Claims, 6 Drawing Sheets

NONBLOCKING SYNCHRONOUS DIGITAL HIERARCHY COLUMN CROSS-POINT SWITCH

TECHNICAL FIELD

This invention relates to data switching, and, in particular, to the ability to provide nonblocking data switching.

BACKGROUND OF THE INVENTION

Space switching of data is traditionally unattractive because the resulting switching matrix with m inputs and m outputs grows at a rate of $m^2$ and becomes physically overwhelming as m increases to a large number of inputs. For example, to provide strictly nonblocking switching of 270 columns for each of 256 STM-1 links using synchronous digital hierarchy (SDH) protocol results in 4,777,574,400 switch elements. Such a large number of switch elements makes it economically unfeasible to build such a switch.

SUMMARY OF THE INVENTION

A technical advance is achieved by an apparatus and method that allow the implementation of a strictly nonblocking cross-point switch central stage for the switching of SDH frames or other formats. The port terminating each incoming link has a time slot interchange (TSI) unit. Each TSI unit comprises incoming and outgoing sets of TSI's. The TSI's properly arrange each byte of each row of the STM-1 frame or other formats to be in the proper position for transmission on the STM-1 links. Within the STM-1 frame structure, each row of a frame is switched in an identical manner but the column designations within a row are switched differently. In response to rearranged frames from incoming TSI's, a cross-point switch is responsive to each column of each of the rows to switch each of the bytes of that column to the appropriate outgoing TSI for rearrangement and transmission on a STM-1 link.

These and other features and advantages of the present invention will become more apparent from the following description of an illustrative embodiment of the invention considered together with the drawing.

DETAILED DESCRIPTION

Figure 1:
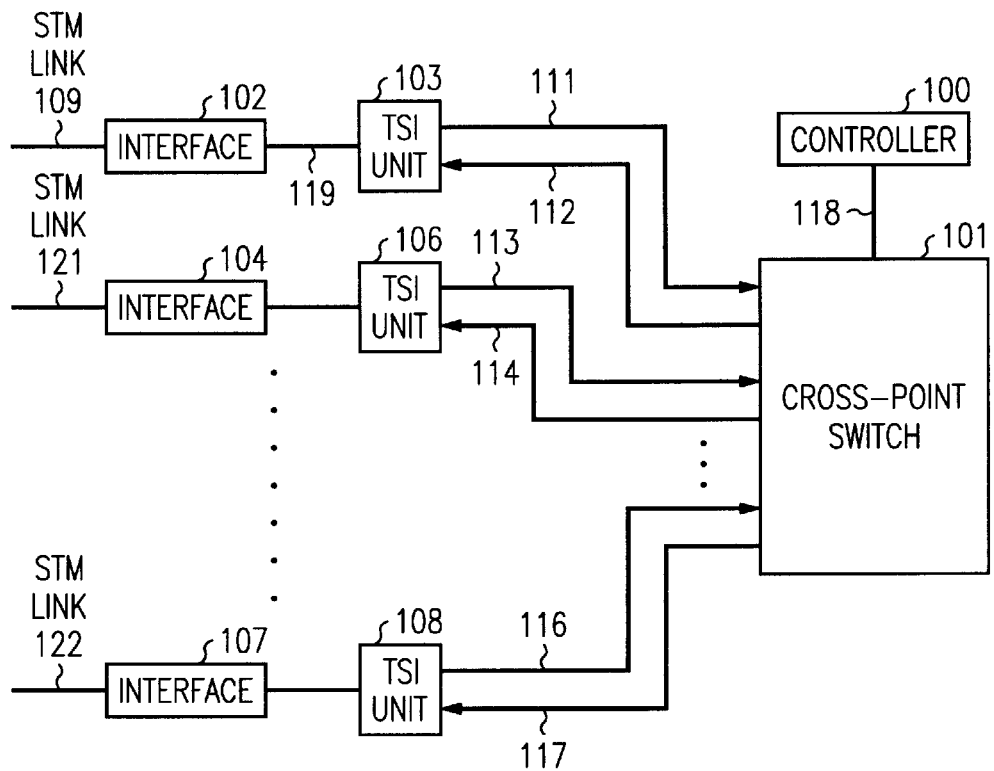
FIG. 1 illustrates, in block diagram form, a switching system in accordance with the invention.
Figure 2:
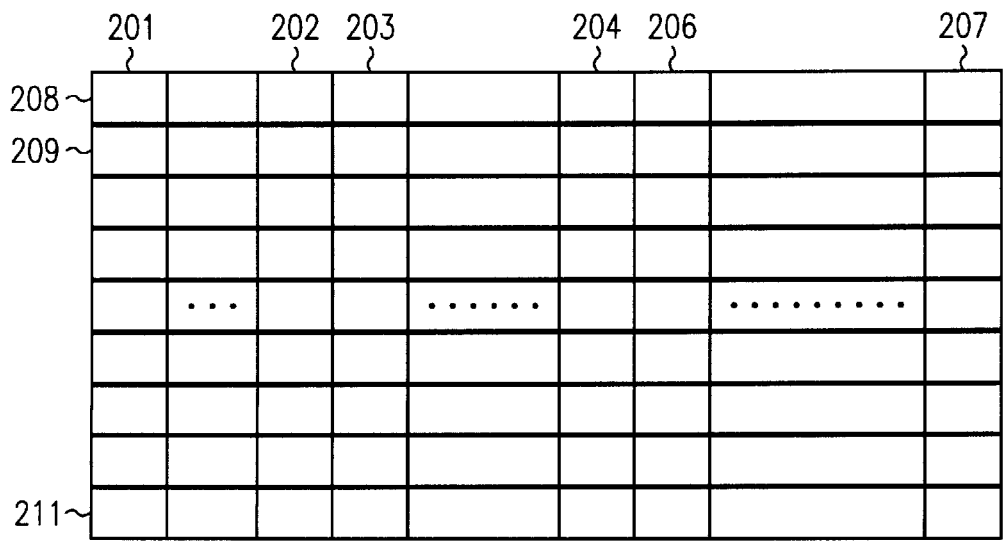
FIG. 2 illustrates an STM-1 frame structure.

FIG. 1 Illustrates a switching system in accordance with the invention. Links 109–112 are illustratively STM-1 links. One skilled in the art would readily envision that other types of STM or formats could be used. Interfaces 102, 104, and 107 terminate these STM-1 links and provide the necessary synchronization between the link and the other elements of FIG. 1. FIG. 2 illustrates the STM-1 frame format. The frame format illustrated in FIG. 2 consists of 270 columns and nine rows. Each column of a row consists of one byte. Each column of each row is capable of being switched to any other column for transmission on another link. The rows of a frame are always switched in the same manner. For example, a byte in column 203 of row 208 is switched in the identical manner as a byte in column 203 of row 209. However, an individual byte in column 203 may well be switched to a different destination than the individual byte in column 204. For example, if column 203 of link 109 is to be switched and transmitted out on link 112, column 203 must be realigned to correspond to the resulting column on link 112.

Figure 3:
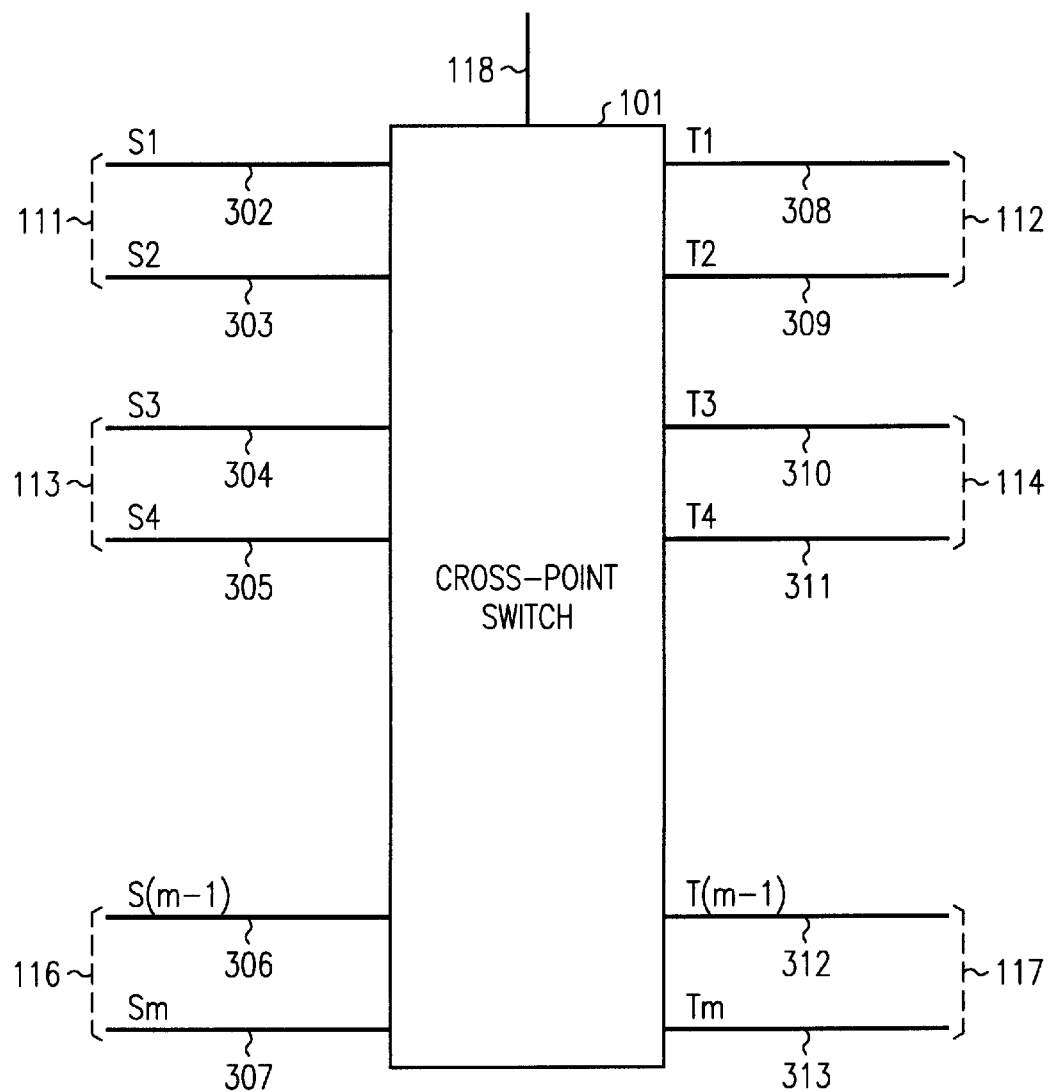
FIG. 3 illustrates input and output links to a cross-point switch in accordance with the invention.
Figure 6:
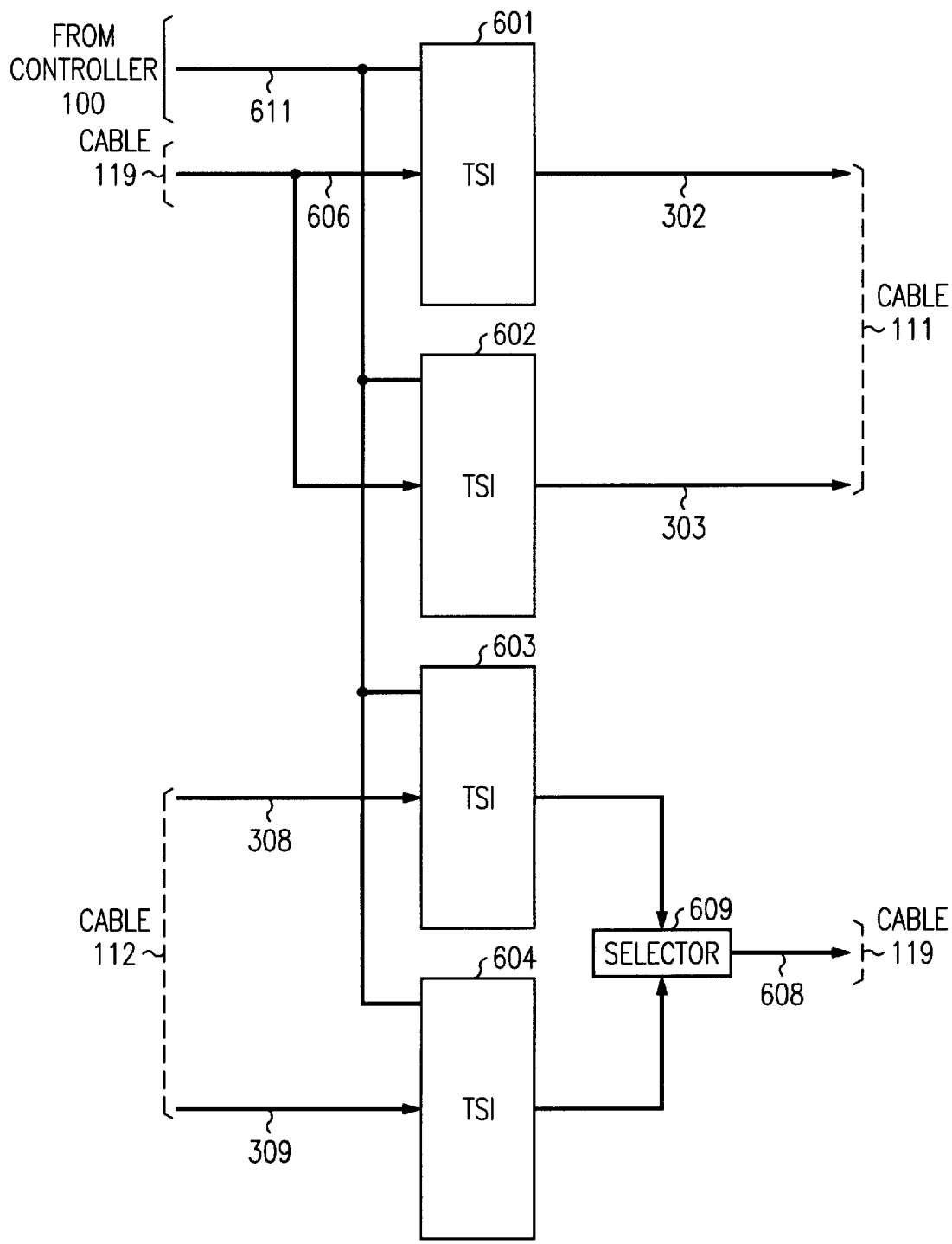
FIG. 6 illustrates, in block diagram form, greater details of a TSI unit.

FIG. 3 illustrates, in block diagram form, greater details of cross-point switch 101. Each link between a TSI unit and switch 101 comprises two sub links. For example, link 111 consists of sub links 302 and 303. This results in twice the number of sub links as STM links. As illustrated in FIG. 6, TSI unit 103 comprise four TSIs. The TSIs are controlled by controller 100 via cable 611. The other TSI units are similar in construction. TSI 601 transfers data to switch 101 via sub link 302, and TSI 602 transfers data to switch 101 via sub link 303. Similarly, TSIs 603 and 604 receive data via sub links 308 and 309, respectively, from switch 101.

Figure 7:
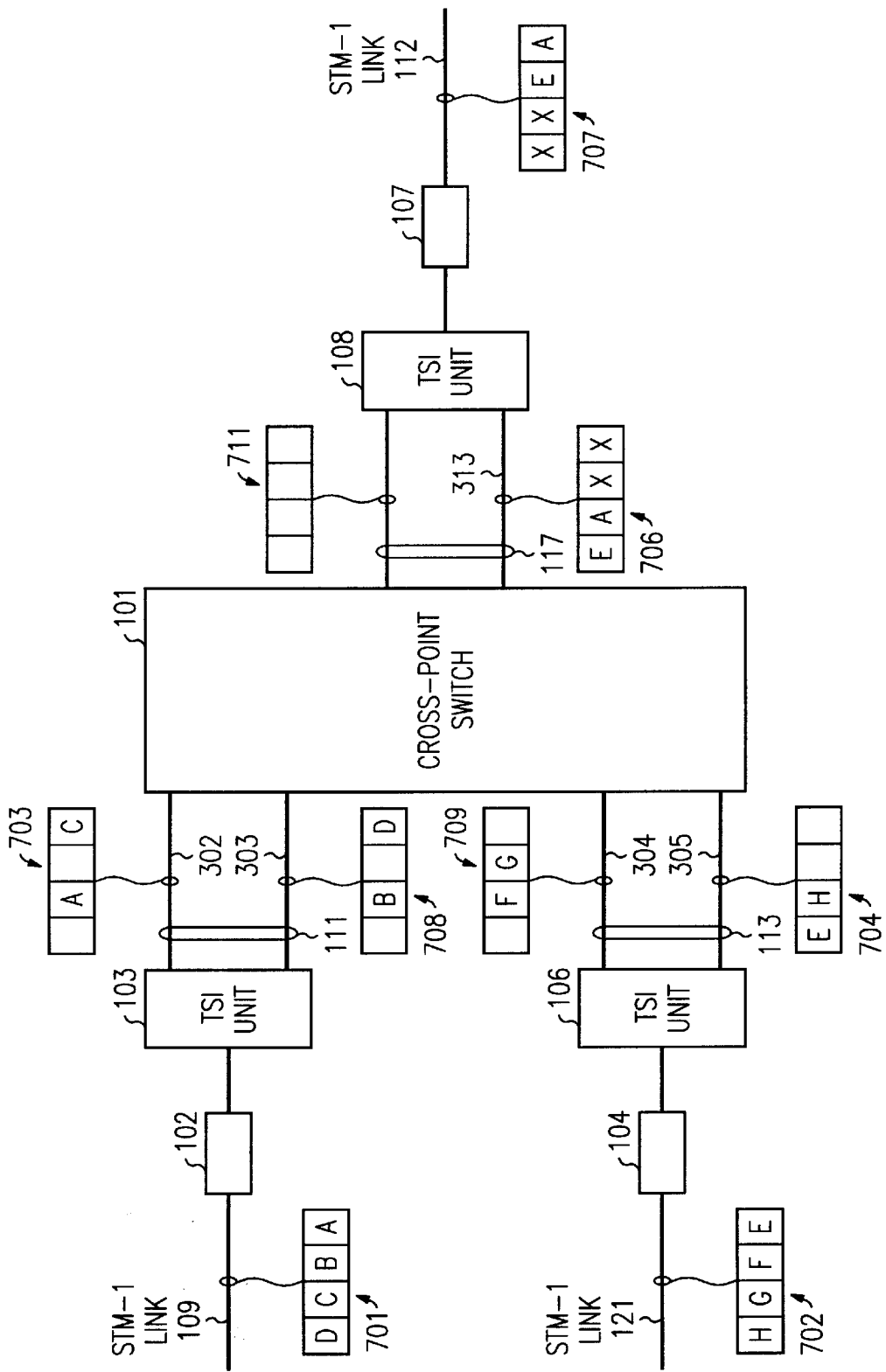
FIG. 7 illustrates a partial version of the switching system with frames of data.

To understand the operation of the switching system of FIG. 1, consider the following example. FIG. 7 illustrates a partial version of the switching system of FIG. 1. In addition, the frame format has been reduced to have only four columns as illustrated in frames 701–711. This is done for ease of description. The details of TSI units 103, 106, and 108 is not given but is illustrated in FIG. 6. Within the frames 701–711, Xs illustrate columns in frame 707 which were not derived from frames 701 and 702. Frames 701 and 702 are being received via STM links 109 and 111. Frame 707 is to be transmitted out on STM link 112 and contains column A from frame 701 being received from STM link 109 and column E of frame 702 being received from STM link 111. TSI unit 103 is responsive to frame 701 being received from STM link 109 via interface 102 to transmit frame 703 via sub link 302 and frame 708 via sub link 303. As can be observed from frame 703, column A is now in the proper position to be switched by cross-point switch 101 into frame 706 that is being assembled on sub link 313 of internal link 117. The contents of frame 708 are of no further consequence to the present example. Controller 100 controls TSI unit 103 to rearrange the columns as illustrated in frame 703. Also, Controller 100 controls cross-point switch 101 to select column A from frame 703 and place this column on sub link 313 at the time illustrated in frame 706. Also, TSI unit 106 is responsive to frame 702 received from STM-1 link 111 via interface 104 to assemble frame 704 on sub link 305 and frame 709 on sub link 305 under control of controller 100. Sub links 304 and 305 are part of internal link 113. As can be observed from FIG. 7, controller 100 can rearrange the columns being received on STM-1 links 109 and 111 in any desired order and transmit two rearranged frames on the sub links leaving a TSI unit. Note, that each TSI unit comprises two TSIs each transmitting on an individual sub link from the TSI unit. Cross-point switch 101 is responsive to frame 704 to select column E and place this column on sub link 313 at the time illustrated in frame 706. TSI unit 108 receives frame 706 on sub link 313 and rearranges columns A and E to have the position in time as illustrated in frame 707. Note, that columns X could have been received from any sub link not illustrated in FIG. 7. One skilled in the art can readily understand that the switching system of FIG. 1 is both non blocking and capable of broadcast switching.

Figure 4:
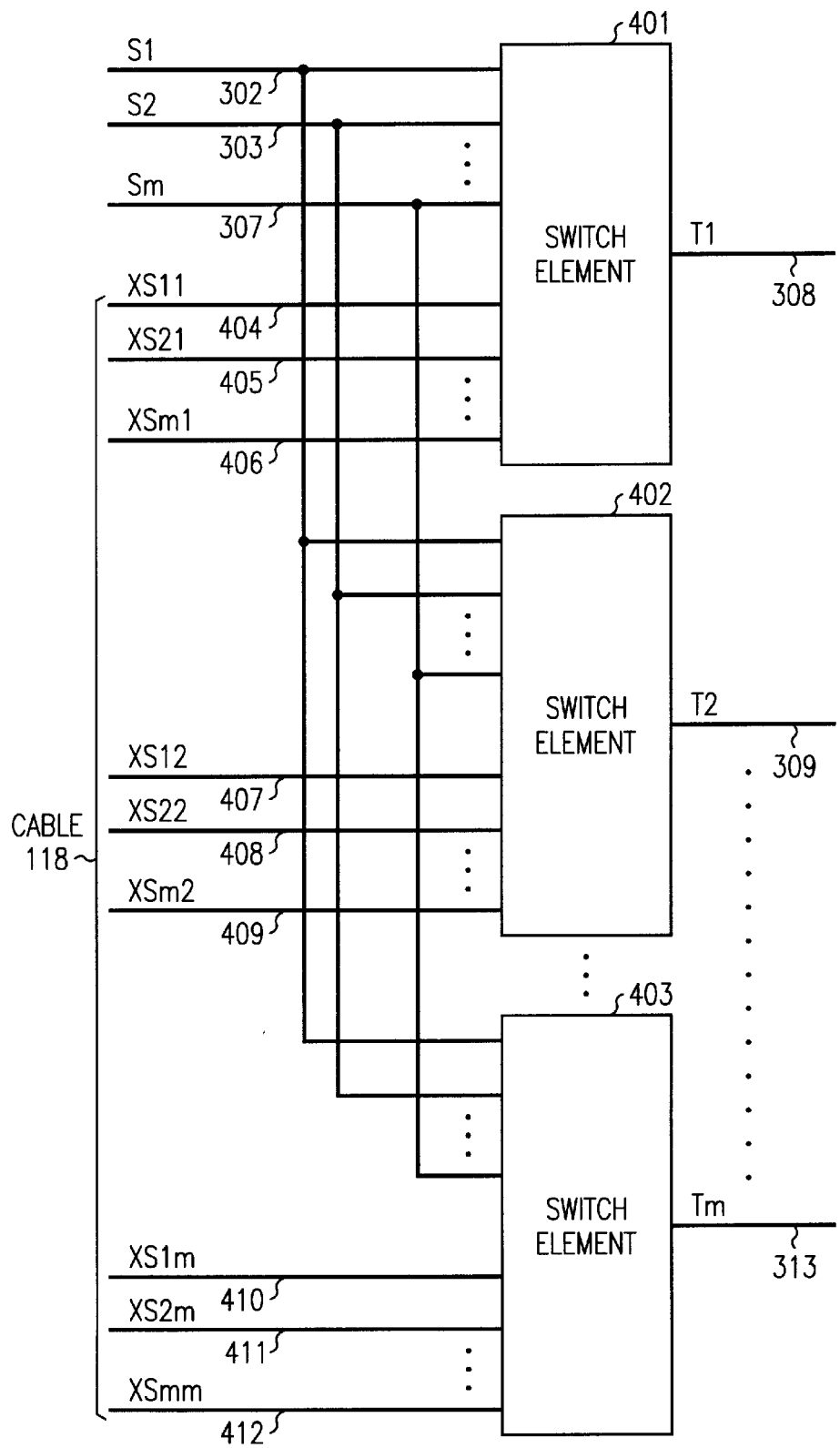
FIG. 4 illustrates, in block diagram form, further details of the cross-point switch in accordance with the invention.

FIG. 4 illustrates greater detail of switch 101. Each switch element terminates each sublink 302–307 from TSI units 103, 106, and 108. Note, each TSI unit comprises two TSIs as illustrated in FIG. 6. The switch elements receive via cable 118 the XSs signals via conductors 404–412. The XS lines select the input that is to be utilized by switch elements 401–403 and determine which output line (Ts) 308–313 will receive the bit presently being transmitted on the selected input line. Bytes denoted in the columns of FIG. 2 are transmitted bit serial over the input lines to switch elements 401–403. For example, a bit from line 302 can be advantageously switched out on all of the output lines 308–313 simultaneously for broadcast switching.

Figure 5:
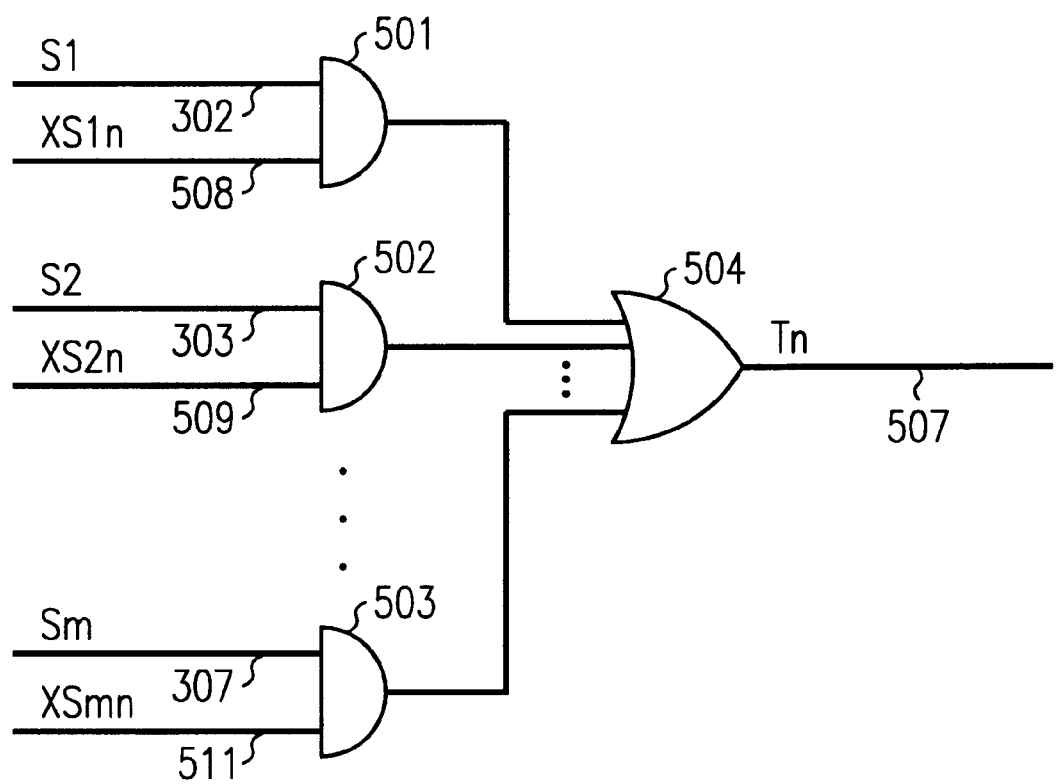
FIG. 5 illustrates a switch element.

FIG. 5 illustrates in greater detail a switch element such as switch element 401. If FIG. 5 illustrates switch element 401, then the numbers denoted by "n" would be "1" and lines 508, 509, and 511 would be connected to lines 404, 405, and 406, respectively, of FIG. 4. Consequently, if the switch element of FIG. 5 denoted switch element 402, then, "n" would be a "2" and lines 508, 509, and 511 would be connected to lines 407, 408, and 409, respectively, of FIG. 4.

What is claimed is:

1. An switching system for switching groups of data between a plurality of external links with each groups of data having subgroups of data, comprising:

a control unit;

a plurality of first units controlled by the control unit and each connected to an individual one of the plurality of external links and an individual one of a plurality of internal links, each of the plurality of first units comprises a plurality of first subunits and each of the plurality of first subunits rearranging each received group of data into a set of rearranged subgroups of data with each set including all of subgroups of data of each of the received groups of data and each set for each of the plurality of first subunits is a different arrangement of subgroups of data wherein one of the rearranged subgroups of data is transmitted by each of the plurality of first units comprises all sets of the rearranged subgroup of data and each of the plurality of internal links comprises a plurality of first sublinks each connected to one the plurality of first subunits of one of the plurality of first units and each of the plurality of first subunits transmitting a set of rearranged subgroups of data on the connected one of the plurality of first sublinks;

a space switching unit connected to each of the plurality of first units by one of a plurality of internal links and receiving rearranged subgroups of data of each of the plurality of groups of data via each of plurality of internal links;

the control unit sequentially transmitting individual reconfiguration information for each of subgroups of data as each is to be switched by the space switching unit wherein the control unit capable of reconfiguring the space switching unit for each of subgroups of data from each of internal links;

the space switching unit responsive to the individual reconfiguration information for reconfiguring to switch each individual rearranged subgroups of data to one of another plurality of internal links;

each of a plurality of second units controlled by the control unit and connected to one of the other plurality of internal links and one of the plurality of external links and each of the other plurality of internal links comprises a plurality of second sublinks and each of plurality of second units comprises a plurality of second subunits each connected to one of the plurality of second sublinks and each of the plurality of second subunits responsive to a switched set of rearranged subgroups of data for rearranging the switched set of rearranged subgroups of data, and each of plurality of second units selecting one of the rearranged switched set of rearranged subgroups of data per subgroup of data for transmission on the connected external link.

2. The apparatus of claim 1 wherein the space switching unit comprises a plurality of cross-point switching elements.

3. The apparatus of claim 1 wherein a group of data is a SDH frame.

4. The apparatus of claim 3 wherein a subgroup of data is a column of a SDH frame.

* * * * *